United States Patent [19]

Gray et al.

[11] 3,854,126

[45] Dec. 10, 1974

[54] CIRCUIT FOR CONVERTING VIRTUAL ADDRESSES INTO PHYSICAL ADDRESSES

[75] Inventors: Robert C. Gray, Cambridge; Larry P. Wade, Acton, both of Mass.; Adrianus J. Van De Goor, Wilnes, Netherlands

[73] Assignee: Digital Equipment Corporation, Maynard, Mass.

[22] Filed: Oct. 10, 1972

[21] Appl. No.: 296,026

[52] U.S. Cl. .............................................. 340/172.5
[51] Int. Cl. .............................................. G06f 9/20
[58] Field of Search .................................. 340/172.5

[56] References Cited

UNITED STATES PATENTS

| | | | |
|---|---|---|---|
| 3,317,898 | 5/1967 | Hellerman | 340/172.5 |
| 3,412,382 | 11/1968 | Couleur et al. | 340/172.5 |
| 3,533,075 | 10/1970 | Johnson et al. | 340/172.5 |
| 3,614,746 | 10/1971 | Klinkhamer | 340/172.5 |
| 3,675,215 | 7/1972 | Arnold | 340/172.5 |

*Primary Examiner*—Harvey E. Springborn
*Attorney, Agent, or Firm*—Cesari and McKenna

[57] ABSTRACT

A method for converting virtual addresses to expanded physical addresses in a data processing system. High order bits of a virtual address select a page address register. An intermediate portion of the virtual address and the contents of a selected page address register are combined and juxtaposed to a third portion comprising low order bits of the virtual address to generate a physical address. During each conversion the second portion of the virtual address and a field in a page descriptor register, corresponding to the page address register, are compared to determine whether the address seeks to reference a memory location outside allocated space. If that condition exists, an executive routine can dynamically change the contents of both the page address and page descriptor registers to thereby relocate the contents of the referenced memory locations and new physical addresses without altering the virtual addresses.

9 Claims, 7 Drawing Figures

CIRCUIT FOR CONVERTING VIRTUAL ADDRESSES INTO PHYSICAL ADDRESSES

BACKGROUND OF THE INVENTION

This invention generally relates to data processing systems and specifically to random access memory systems used in such data processing systems.

Random access memory units store instructions, arranged as programs, and corresponding data for retrieval by a central processor unit. The central processor unit executes instructions in sequence and uses the data to generate other data which it can then store in the random access memory unit. Each location in the random memory unit is identified by a unique physical address which must be provided to obtain data or instructions from the memory unit or to store data or instructions in the memory unit.

In basic data processing systems, the central processor unit generates a number which is the physical address. This number may be an express or implicit physical address. Implicit physical addresses are generated by known indexing, indirect or deferred addressing methods.

Contemporary data processing systems often are accessible to a plurality of users and in such cases they operate in a "multiprogramming" mode. In order to provide maximum convenience, each user has a "virtual" machine. The individual programmer writes his program as though it is to be run by itself, and the program may use all the system resources accordingly. The system provides the services necessary to support the program and coordinate it with other programs in operation. The physical hardware in the system is combined with an executive program to simulate a more powerful hardware machine for which the programs are written. With this type of multi-programming each user, to all intents and purposes, has his own dedicated computer system.

Contemporary data processing systems also "time-share" two or more programs. While instructions in each program are actually executed sequentially, an executive control determines how much of a single program will be executed at a time. The central processor unit then appears to be operating on several programs simultaneously. Hence, time-sharing includes multi-programming concepts.

Multi-programming introduces an addressing problem. The programmer or the executive program must be sure that addresses in one program do not conflict with physical addresses in another program. Hence, conventional physical addressing concepts are difficult to implement in a multi-programming environment.

Therefore, multi-programming data processing systems use "virtual addressing". With virtual addressing, a programmer writes his program as though the program is to be run by itself on its own, or virtual machine. Several programs may refer to the same virtual address, but these are different physical addresses.

In more sophisticated systems, programs are also stored on auxiliary memory devices. When the executive program determines a need for a particular program, it moves it into the memory unit in a first set of physical addresses. After being executed, the program is returned to the auxiliary memory device. At a later time it may be recalled, but stored in another set of physical addresses. However, the virtual program addresses do not change.

Thus, a multiprogramming data processing system must include some means to convert virtual addresses into physical addresses. It is absolutely essential that the data processing system contain some means for assuring the conversions are made properly so that a virtual address in one program only refers to its corresponding physical address and not to some other physical address which corresponds to the same virtual address in another program.

In order to simplify the transfer of programs and data to or from a memory unit, prior data processing systems include means for segmenting either the random access memory or such auxiliary memory as magnetic disk or drum memories. Basically, these systems arbitrarily divide a memory unit into "pages". Each page has a fixed length; that is, the number of memory locations in a page does not vary from page to page. As space utilization in a memory unit is an important consideration, page length must be carefully selected in a fixed-length page system. If the pages are too long, a short program resides in only a few locations so the remaining locations are not used. On the other hand, transfer times between the auxiliary and main memories significantly affect the time required to execute a program. If short page lengths are used to increase memory utilization, then a single program may occupy several pages and require several transfers thereby slowing the operating speed.

Prior data processing systems have maximized the utilization of space in auxiliary memory devices such as magnetic disk and drum units, but not in a main memory. In one approach, the auxiliary memory device is divided into a number of very small pages, and a single program may then be stored on a number of consecutive pages. When the central processor unit needs to obtain the program, it then transfers in a first page. The page size is chosen so that the central processor unit can execute all the instructions on the page before the next page is ready for transfer. Then the central processor unit can either execute or bypass successive pages. In this system, an executive program reacts when a page is not called in succession by shifting the central processor unit resources to another program. However, in this approach a great deal of time is spent making transfers as each short page requires a separate transfer.

Therefore the object of this invention is to improve the overall operating efficiency of a data processing system operating in a multi-programming mode.

Another object of this invention is to provide a data processing system which minimizes the time necessary to execute programs in a multi-programming system.

Yet another object of this invention is to provide a data processing system in which programs are stored in memory efficiently from a space standpoint.

SUMMARY

In accordance with this invention, a programmer writes his program with virtual adresses. When the central processor unit executes a given program, the virtual addresses in that program are converted to the corresponding physical addresses. Blocks or memory pages for storing the program are allocated and the length of the page is specified so that each page length is optimized for the program it contains. In this manner, the data system can operate so it transfers a full page during a single transfer operation. Hence, transfer times can be significantly reduced. On the other hand, the amount of unused locations in a given page is minimized so memory space utilization is improved.

This invention is pointed out with particularity in the appended claims. A more thorough understanding of the above and further objects and advantages may be attained by referring to the following description taken in conjunction with the accompanying drawings.

DESCRIPTIVE OF AN ILLUSTRATIVE EMBODIMENT

Figure 1:
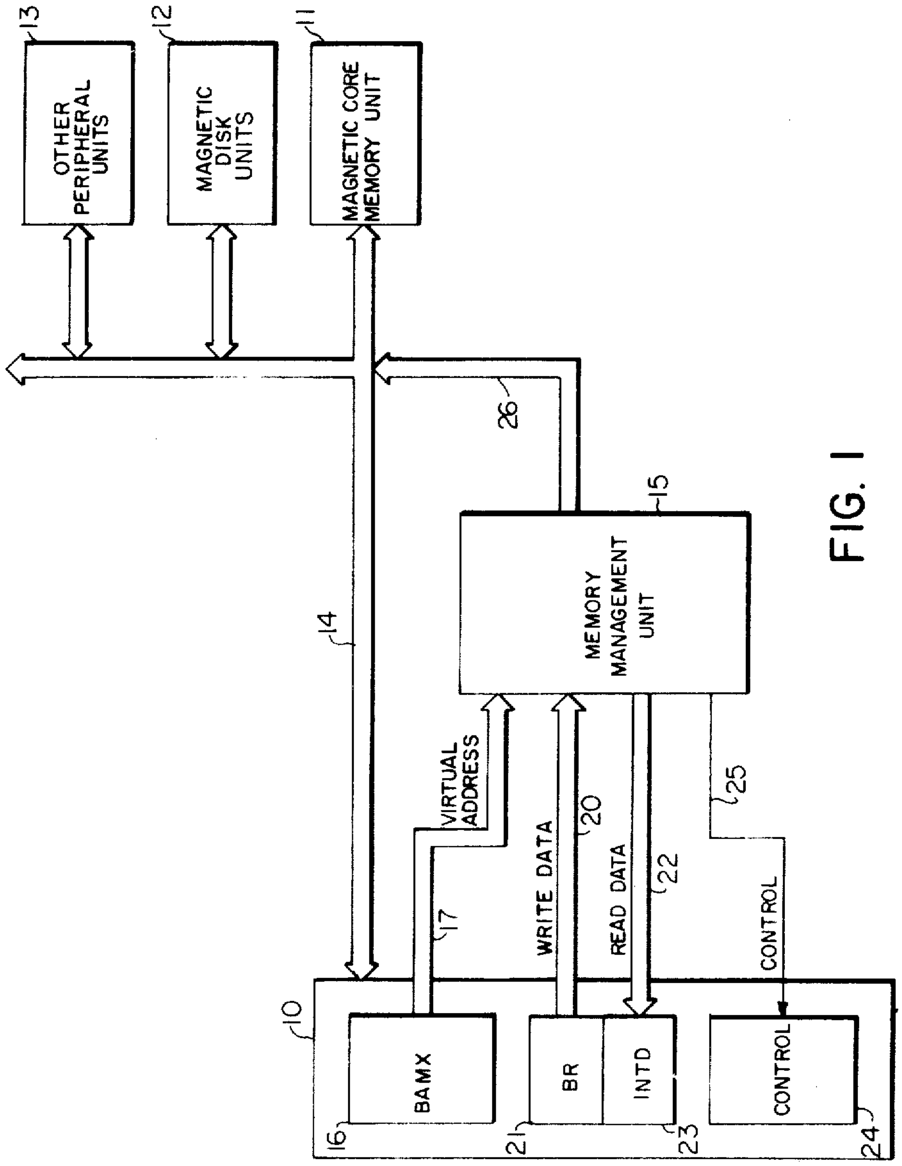
FIG. 1 is a block diagram of a data processing system incorporating this invention.

Referring to FIG. 1, a central processor unit 10, a magnetic core memory unit 11, one or more magnetic disk memory units 12 and other peripheral units 13 all connect in parallel to a portion of a bus 14. The magnetic core memory unit 11 is a working memory for the central processor unit 10. As known, these units 11, 12 and 13 are accessed by specifying an address, and each of these units has a unique address in the bus 14. Thus, the units 11, 12 and 13 can be considered as constituting physical locations connected to the bus.

In accordance with this invention the central processor unit 10, under the control of an executive program, can execute two or more user programs stored in the memory unit 11 and further can shift programs between the magnetic core memory unit 11 and the magnetic disk memory unit 12 as necessary to facilitate an efficient processing of different user programs. An example of such a system is a PDP-11 Data Processing System as described in a PDP-11/20, 15, r20 Processor Handbook published by the assignee of this invention in 1971. In accordance with this invention, such a system is improved because each program may use any system resource as necessary for its execution. The control which provides each programmer with a virtual machine is contained in a memory managment unit 15 constructed in accordance with this invention which connects to the central processor unit 10 and to address conductors in the bus 14.

The memory management unit 15 receives a virtual address from a bus address multiplexer 16 within the central processor unit 10 over a virtual address bus 17. A bus 20 receives data from an internal BR register 21 which can obtain data from several sources within the central processor unit 10. Another bus 22 provides a data path from the management unit 15 to an internal data (INTD) register 23. Control signals pass from a control unit 24 in the central processing unit 10 to the memory management unit 15 over a control bus 25.

The number of memory locations which the central processor unit 10 can address directly is controlled by the number of bits in an address. If, for example, an address contains 16 bits, then only $2^{16}$ words can be addressed directly. With multiprogramming, however, the memory unit may require $2^{18}$ locations, or more. The memory management unit 15, in accordance with this invention, converts the virtual address into a physical address and expands it; that is, it converts a 16-bit virtual address into a unique 18-bit physical address in the magnetic memory unit 11. The memory management unit 15 thus constitutes an address conversion unit; however it also controls paging and tailors each page to the program it contains to minimize wasted core space for unused page portions while minimizing the number of memory transfers.

Figure 2:
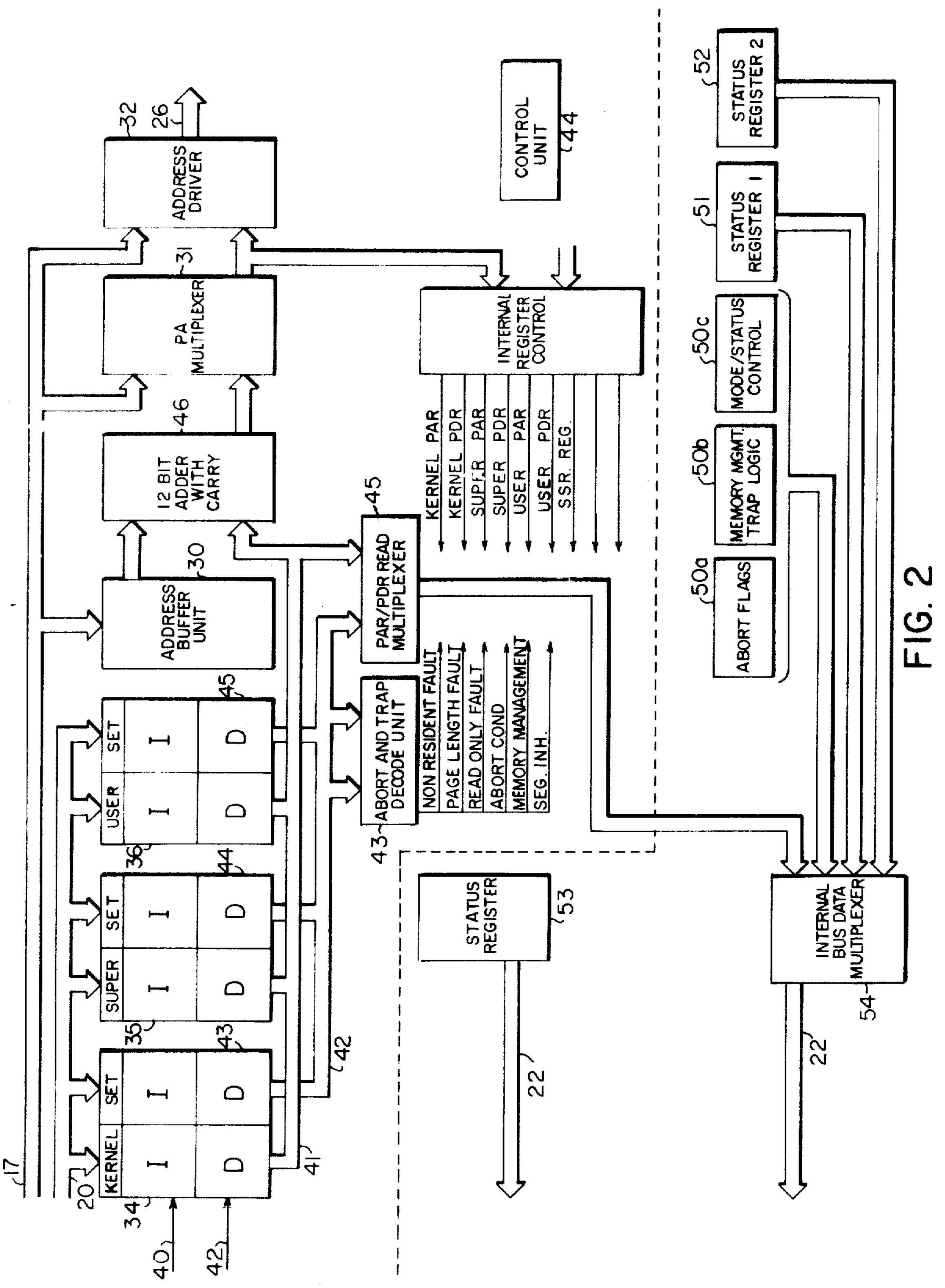
FIG. 2 is a block diagram of the memory management unit shown in FIG. 1.

FIG. 2 shows a memory management unit 15 in some detail. This unit is adapted for use in a central processing unit 10 which can operate in kernel, supervisor and user modes. There is a corresponding division of programs into kernel, supervisor and user programs. In effect the kernel and supervisor programs constitute a total executive program. The basic kernel program is allowed to perform any operations while the supervisor program cannot perform certain privileged operations but can provide various services useful to the executive program and to the user programs. Still further protection against modification of the supervisory program by the user program or of the kernel program by either the supervisor or user programs results from storage of programs in separate address sections. That is, the physical location in the core memory unit 11 is divided into kernel, supervisor and user sections.

The memory management unit 15 shown in FIG. 2 operates in a data computing system in connection with a central processing unit 10 which is operable in kernel, supervisor and user modes. Each time a virtual address appears on the address bus 17, portions of the address are stored in an address buffer unit 30, a physical address multiplexer 31 and an address driver circuit 32 which eventually transmits the physical address on the bus 26 which connects to the address conductors on the bus 14.

In order to generate a physical address, the unit 15 requires additional data. This is data stored in a series of page address registers which are grouped in sets corresponding to each operative mode. Hence, page address registers 34 are kernel registers while sets 35 and 36 are supervisory and user registers respectively.

Each set of page address registers is divided into instruction and data subsets. Hence in the following discussion the reference 34I identifies an instruction page address register while 34D designates a corresponding data page address register.

A read bus 40 provides address bits to identify a particular page address register in each set and carries one portion of the virtual address comprising the high order bits; for example, the three high-order bits in the virtual address select one of eight registers in each set, the selected register contents being loaded onto a page address register bus 41. Any time address bits appear on read bus 40 data, the bus 41 receives the data.

A write bus 42 also carries addresses and produces a writing operation whereby data on the bus 20 is read into a selected one of the registers.

A second set of registers is associated with each page address register. These are page descriptor registers 43, 44 and 45, likewise divided into data (D) and instruction (I) sections. The contents of each page descriptor register appears on bus 42 simultaneously with the contents of its corresponding page address register. The contents of the page descriptor register can also be changed by applying the proper address on the write bus 42 and data on the bus 20.

Figure 3:
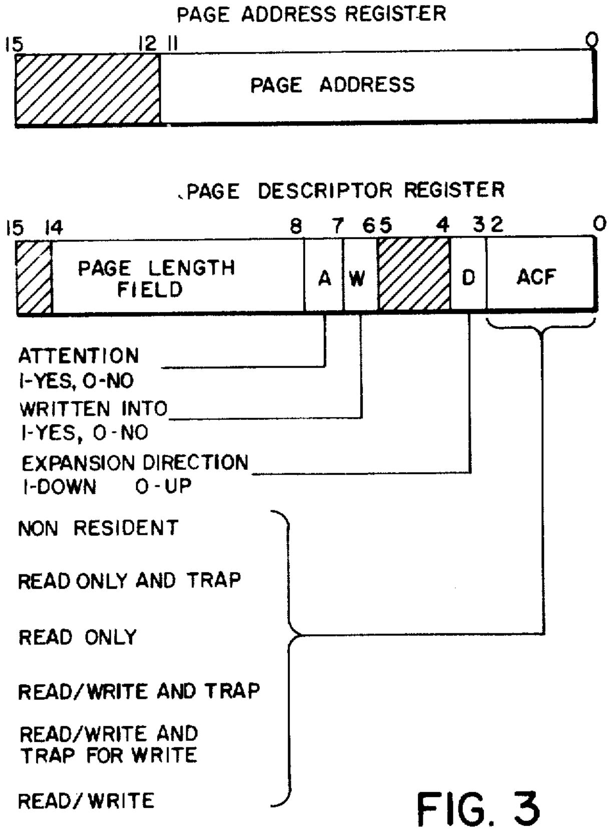
FIG. 3 is a graphical illustration of a page address register and page descriptor register used in the circuit shown in FIG. 2.

FIG. 3 shows the organization for a page address register and page descriptor register. The page address register contains the base physical address of a page in the memory unit 11 in the form of a 12-bit page address field. Its use is detailed later. The page descriptor register shown in FIG. 3 has several different fields related to page expansion, page length and access control. Specifically, an ACF field identifies the manner in which a page may be accessed. If the ACF field is keyed to designate a non-resident access, an abort and trap decode unit 43 (FIG. 2) transmits a non-resident fault signal. Read-only-and-trap or read-only settings for the ACF field cause a control 44 in the memory management unit 15 to abort any further operations; the unit 43 generates a read-only fault. If the ACF field designates a read-only-and-trap, the central processor unit 10 (FIG. 1) traps to a specified location in kernel space in the magnetic memory unit 10. A read-write-and-trap setting for the ACF bits in FIG. 3 causes the unit to undergo a memory management trap to a location in the kernel space upon completion of either a read or write operation while a read-write-and-trap for write setting causes the trap only on completion of a write. If a read/write setting is defined by the contents of the ACF field, then read or write operations occur without any trap or abort signals from the abort or trap decode unit 43 (FIG. 2).

Still referring to FIG. 3, the next most significant bit (bit 3) is a D bit which determines the direction in which a page in the magnetic memory core unit 11 is expanding. For example, $D = 1$ designates a page which is expanding downwardly (i.e. consecutive locations are obtained by decrementing an address) while $D = 0$ indicates an upward expansion.

Bit 6 (the W bit) in FIG. 3 is set (i.e. $W = 1$) anytime the contents of a page are altered. The control unit 44 and the executive programs monitor this at the time of a swapping operation. If the W bit is set then the page must be rewritten into the magnetic disk memory unit location to update the contents at that location. Otherwise no transfer is necessary back, and a single transfer operation is saved.

Bit 7 (the A bit) determines whether any memory access has generated a memory management trap. It is useful for gathering memory management statistics.

The final field of the page descriptor register comprises bits 8 through 14. It is a page length field and specifies the length of a page in a number of predetermined size blocks. Thus, the page length field specifies a number of consecutive address locations in a page which the page address register identifies.

It is now possible to explain how a virtual address can be used to identify a unique physical address. The most graphic description of this can be seen in FIG. 4 making reference to FIG. 2. This discussion is again limited to a 16-bit virtual address in a system which requires an 18-bit physical address.

Whenever a virtual address is received, it is divided into three portions including an address for a page field (bits 13 through 15), a block number (bits 6 through 12) and a word number (bits 9 through 5). Assuming that even numbered virtual addresses identify successive word locations, the word number therefore cycles on a modulus of 32 words. Hence each time the virtual address increases by 32 words it increments the block number by one.

Figure 4:
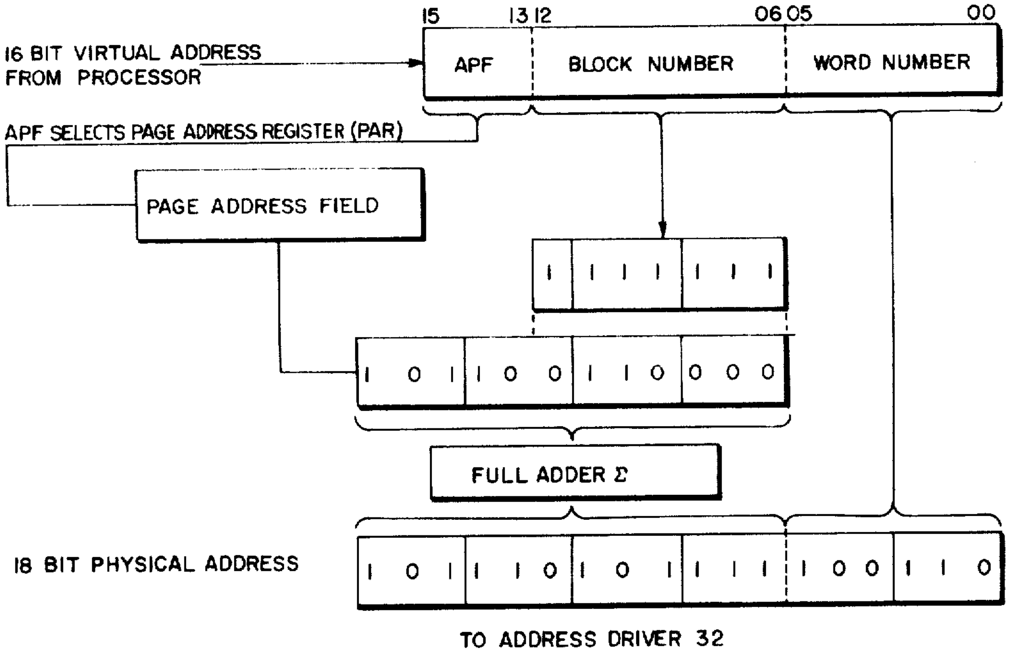
FIG. 4 is a flow chart illustrating the steps of an address conversion.

The three high-order bits are coupled onto the read bus 40 shown in FIG. 2 to select a page address register and corresponding page description register. The resulting data is coupled into a multiplexer 45 and one input of an adder 46. The address buffer 30 couples the block number from the virtual address into another input to the adder 46 in such a way that the block number and page address field are right justified. The resulting address is then coupled through the multiplexer 31 to the high order bits of the address driver 32 where it is juxtaposed with the word number from the virtual address which occupies the least significant bit positions. As shown in FIG. 4, therefore, the physical address contains 18 bits. Six bits are the original word number, and twelve bits are formed by adding the block number and the base address for a page obtained from the page address register identified by the three-high order bits in the virtual address.

Before discussing the flow diagram of FIG. 5 which defines the timing sequence for the memory management unit, it will be helpful to discuss other elements which the memory management unit of FIG. 2 contains. An SRO register 50 has three basic sections designated by numberals 50*a*, 50*b*, and 50*c*. This register contains abort error flags and memory management enabling and trap flags and stores other essential information required by the executive program to recover from an abort or to service a memory management trap.

An SR1 register 51 records any information regarding the automatic incrementing or decrementing operations. This information is used in recovering from an abort operation.

An SR2 register 52 stores the virtual address at the beginning of each instruction or the address of an interruption routine at the beginning an interruption operation. This register constitutes a virtual address program counter.

The final SR3 register 53 stores instruction or data space control information. There is one bit position in the SR3 register 53 for each mode. If a space in the mode bit is not set, then the selection of registers from the sets 34, 35 or 36 is limited to the instruction section.

The SR3 register 53 can shift data onto the lower order bit conductors for the bus 22. Signals from each of the other SR registers 50, 51 and 52 are coupled onto the bus 22 through an internal bus data multiplexer 54. The internal bus data multiplexer 54 also receives signals from the multiplexer 55.

Figure 5A:
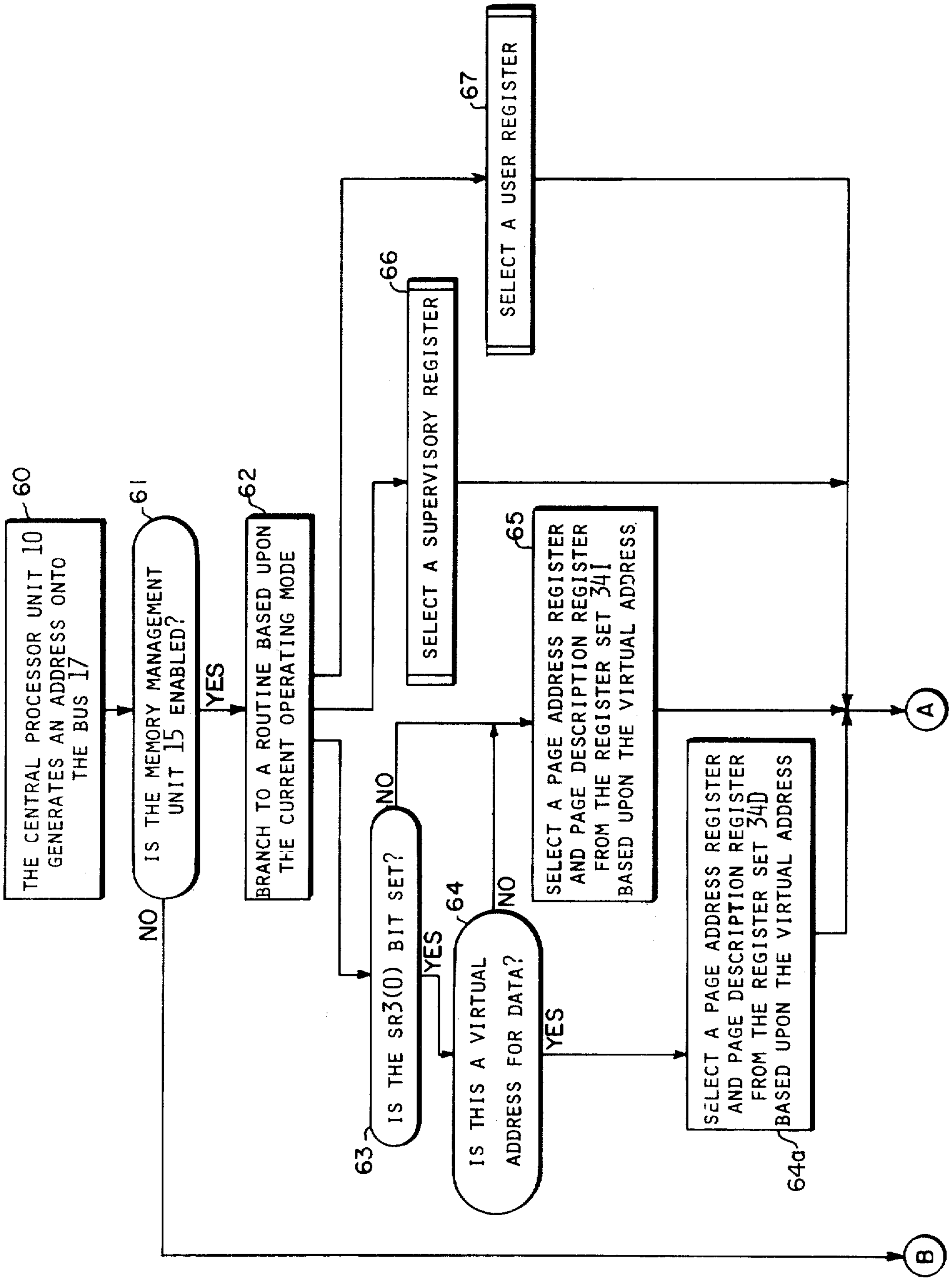
FIGS. 5A, 5B and 5C constitute a flow chart illustrating timing in the circuit of FIG. 2.

FIG. 5A shows the timing sequence for the memory management unit in response to the central processor unit 10 generating a virtual address. Initially an address appears on the bus 17 as shown in Step 60. In Step 61 the control unit 44 determines whether the memory management unit 15 is enabled to perform a conversion. It does this by examining a specified bit position in the SRO register 50. If the memory managment unit 15 is not enabled, then no conversion occurs and the virtual address is the physical address.

In Step 62, the control 44 determines the operating mode for the central processor unit 10 and branches to a following operation depending upon the mode. A branch in the kernel mode causes the control 44 to determine, from the contents of the "two" bit in the SR3 register 53, whether the virtual address is to a data portion (Step 64). Step 64*a* selects a page address register and page decriptor register from the register 34D based upon the virtual address. Specifically the three most significant bits in the virtual address identify one of eight page address registers and page descriptor registers.

Analogous operations occur when Step 62 diverts to a routine 66 for a selecting a supervisory register or a Step 67 for selecting a user register. The basic difference is that in steps analogous to Step 63 the control examines bits in the SR3 register 53 corresponding to the supervisory mode and user modes respectively.

Figure 5B:
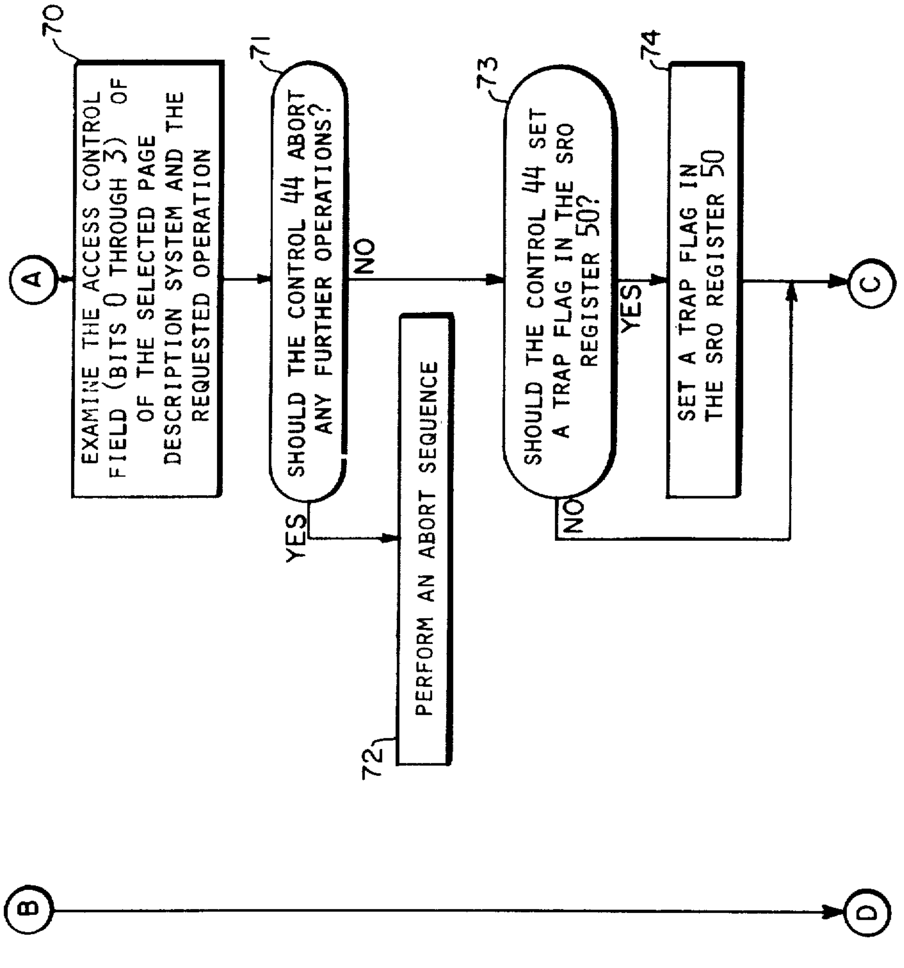
Figure 5C:
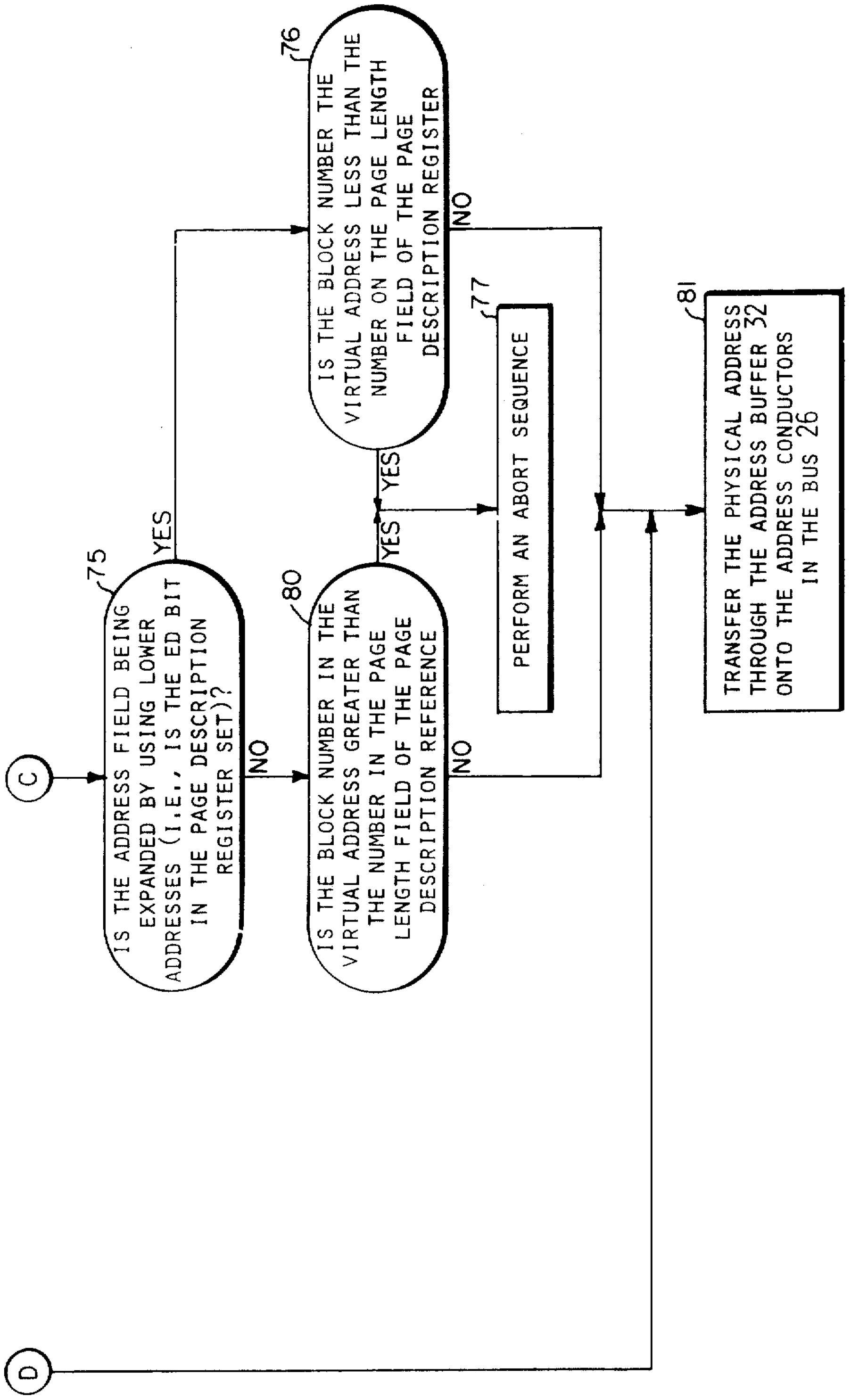

After a page is selected, Step 70 in FIG. 5B examines the access control field (bits 0 through 3) in the selected page descriptor register in view of the requested operation. If Step 71 determines that the control 44 should abort any further addressing operations, Step 72 performs in abort sequence. This sequence occurs, for example, if an attempt is made to write into a memory space when the ACF field of the page descriptor register is set for read-only operations.

Assuming that it is not necessary to abort the sequence, Step 73 determines, from the ACF field of the page descriptor register, whether Step 74 should set a trap flag in the SR0 register 50. In Step 75 (FIG. 5C) the control 44 determines whether the address field is being expanded upwardly or downwardly. This is done on the basis of the D bit in the page descriptor register. If the D bit is set, Step 75 diverts to Step 76 where the block number in the virtual address and the number in the page length field are compared. If the block number is less than the number in the page length field an invalid address exists and the control 44 performs an abort sequence in Step 77 to thereby prevent the memory management unit 15 from transmitting the invalid address.

If the address is being expanded upwardly, Step 75 diverts to Step 80 where the block number of the virtual address is compared with the page length field. In this case a greater block number causes Step 80 to divert to Step 77; otherwise Step 80 diverts to Step 81 whereupon the control 44 transfers the physical address onto the bus 26. This address is obtained, as previously indicated, by combining the virtual address and the contents of the page address register.

Therefore the circuit in FIG. 2 automatically converts or maps a virtual address into a physical address by the use of page address and page descriptor registers. This occurs without a possibility of one program operating improperly in the physical address locations another program uses.

As also shown in Steps 76 and 80, that the control 44 continually checks to determine whether an address is being specified as outside a given field. When this occurs, the executive program can change the field merely by finding, from a memory map of unused locations it retains, an area of physical memory which can take an expanded amount of space. The executive program updates or alters the corresponding page address register by storing a new page address and the page descriptor register by changing the page length field. As the page length field is incremented by a specified number of blocks (i.e., 32-word blocks in the specific embodiment), it is possible to tailor a page length to a particular program to maximize memory use. Further, transfer times are minimized because a single transfer operation moves one entire page.

Hence, the memory management unit 15 shown in FIG. 1 and in detail in FIG. 2, provides an envirionment for multiprogramming and for time sharing which enables the central processor unit to operate very efficiently. It will be apparent that other specific embodiments and control sequences can produce the same of set operations and advantages. Therefore, it is the object of the appended claims to cover all such variations and modifications that come within the true spirit and scope of this invention.

What is claimed as new and desired to be secured by Letters Patent of the United States is:

1. A data processing system comprising:

A. a bus comprising a plurality of conductors,

B. a plurality of physically addressed storage locations connectible to said bus, C. a central processor unit for processing a program stored in certain of said storage locations, said program being written for operation in a virtual machine and including virtual addresses, each virtual address being divided into first, second and third portions, and D. an address conversion unit connected between said central processor unit and said bus for transmitting onto the bus, in response to each virtual address from said central processor unit, a physical address for selecting a said storage location, said address conversion unit including:

i. a plurality of page address registers, each storing a base physical address for a block of consecutively addressed ones of said storage locations, ii. a page descriptor register corresponding to each of said page address registers, each page descriptor register storing a page length number representing the number of said consecutive storage locations which have been assigned to the base physical address in the corresponding one of said page address registers, iii. means responsive to the receipt of the first portion of each virtual address from said central processor unit for identifying a page address register and a corresponding page descriptor register, iv. address transmission enabling means for transmitting an enabling signal in response to a comparison of the second portion of each virtual address which indicates a selected number of locations and the page length number in the identified page descriptor register if the desired physical address will be a storage location assigned to the said page address register, v. means responsive to said enabling signal to combine the base physical address in the identified page address register and the second portion of each said virtual address for generating intermediate physical addresses, and vi. final address generating means coupled to said address transmission enabling means for combining the third portion of each said virtual address and the corresponding intermediate physical address to produce a final physical address for transmission onto said bus.

2. A data processing system as recited in claim 1 wherein said address conversion unit additionally comprises means for selectively altering, in response to first signals from said central processor unit, the page length number in said identified descriptor register in response to the absence of an enabling signal from said address transmission enabling means to increase the number of locations assigned to the identified page address register.

3. A data processing system as recited in claim 2 wherein said central processor unit additionally includes means responsive to an interruption signal and wherein said address conversion unit additionally includes fault generating means responsive to the absence of an enabling signal for transmitting the interruption signal to said central processor unit, said central processor unit interruption means being responsive thereto for generating said first signals which enable said selective altering means to change the page length number in the identified one of said page descriptor registers.

4. A data processing system as recited in claim 3 wherein said address conversion unit additionally includes means for changing the base physical address in a page address register in response to second signals from said central processor unit.

5. A data processing system as recited in claim 4 wherein said central processor unit includes means for operating in one of a set of operating modes, said address conversion unit including:

i. a plurality of page address and page descriptor registers arranged in a multiplicity of sets, each set corresponding to one of the system operating modes, and ii. means responsive to third signals indicating the operating mode of said central processor unit for selecting a corresponding set of said page address and page descriptor registers for use by said address conversion unit during that operating mode.

6. A data processing system as recited in claim 4 wherein said page address and page descriptor registers are arranged in a multiplicity of sets and wherein certain blocks of consecutive storage locations are designated to store data while other blocks are designated to store other information, said address conversion unit including a register set for identifying instruction storage locations, a register set for identifying data storage locations and means for selecting a set of registers depending upon whether the virtual location identifies a storage location which contains data or the other information.

7. An address conversion unit used in a data processing system having a plurality of addressable storage locations selected by a first number of parallel address signals on a multiconductor bus and identified by physical addresses and a central processor unit for processing instructions which identifies the locations by means of virtual addresses, each virtual address being divided into first, second and third portions, each virtual address comprising a second number of parallel address signals which is less than the first number of address signals, said address conversion unit connecting said central processor unit to the bus after converting each virtual address to an expanded physical address which uniquely identifies one of the storage locations, said address conversion unit comprising:

A. a plurality of page address registers, each storing a base physical address for a block of consecutively addressed ones of the storage locations, each base physical address in a page address register having more bit positions than the number of parallel virtual address signals which constitute the first and second portions of a virtual address, B. means responsive to the receipt of a first portion of each virtual address from the central processor unit for identifying a page address register, C. adder means for adding the second portion of each virtual address to the base physical address in the identified page address register to obtain an intermediate base address, and D. final address generating means for concatenating the third portion of each virtual address to the least significant portion of the intermediate base address to produce to thereby produce a unique physical address for each storage location, said address conversion unit transmitting said physical address onto the bus.

8. An address conversion unit as recited in claim 7 additionally comprising:

A. a page descriptor register corresponding to each of said page address registers, each page descriptor register storing a page length number representing the number of consecutive storage locations which have been assigned to each said base physical address in the corresponding one of said page address registers, and B. address transmission enabling means for transmitting an enabling signal in response to a comparison signal from means for comparing the second portion of each virtual address which indicates a selected number of locations and the page length number in the corresponding page descriptor register if the desired physical address will be a location assigned to said page address register, said final address transmitting means being enabled in response to the enabling signal.

9. An address conversion unit recited in claim 8 additionally comprising:

A. fault generating means responsive to the absence of an enabling signal during an address conversion for generating a system interruption signal, the central processor unit including means responsive to such an interruption signal to produce first signals, B. means for selectively altering the page length number in said corresponding page descriptor register in response to said first signals from the central processor unit, and C. means for altering the base physical address in said corresponding page address register in response to second signals from the central processor unit.

* * * * *

UNITED STATES PATENT OFFICE

CERTIFICATE OF CORRECTION

Patent No. 3,854,126 Dated December 10, 1974

Inventor(s) Robert C. Gray et al

It is certified that error appears in the above-identified patent and that said Letters Patent are hereby corrected as shown below:

In the Abstract

Line 5, after "a" insert --portion of--

In the Specification

Column 3, line 1, after "data" insert --processing--

Column 6, line 27, change "numberals" to --numerals--

Column 7, line 54, after "80" insert--(in FIGURE 5C)-- same line, after "control" insert --unit-- same line, after "44" insert --(FIGURE 2)--

Column 10, line 21, delete "to thereby produce"

Signed and Sealed this

*sixteenth* Day of *December 1975*

[SEAL]

*Attest:*

RUTH C. MASON
*Attesting Officer*

C. MARSHALL DANN
*Commissioner of Patents and Trademarks*